United States Patent
Hanson et al.

(10) Patent No.: US 10,310,505 B1
(45) Date of Patent: Jun. 4, 2019

(54) SEAMLESS VEHICLE ENTRY

(71) Applicant: Uber Technologies, Inc., San Francisco, CA (US)

(72) Inventors: Eric James Hanson, San Francisco, CA (US); Molly Castle Nix, San Francisco, CA (US); Sean Chin, Pittsburgh, PA (US); Dennis Zhao, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/877,689

(22) Filed: Jan. 23, 2018

Related U.S. Application Data

(60) Provisional application No. 62/593,422, filed on Dec. 1, 2017.

(51) Int. Cl.
| | |
|---|---|
| *G05D 1/00* | (2006.01) |
| *G05D 1/02* | (2006.01) |
| *B60R 25/24* | (2013.01) |
| *H04B 17/318* | (2015.01) |
| *G08B 7/06* | (2006.01) |
| *H04B 17/336* | (2015.01) |

(52) U.S. Cl.
CPC ........... *G05D 1/0088* (2013.01); *B60R 25/24* (2013.01); *G05D 1/0274* (2013.01); *B60R 2325/205* (2013.01); *G08B 7/06* (2013.01); *H04B 17/318* (2015.01); *H04B 17/336* (2015.01)

(58) Field of Classification Search
CPC ............................. B60R 25/24; G01D 1/0088
See application file for complete search history.

(56) References Cited

U.S. PATENT DOCUMENTS

| | | | | |
|---|---|---|---|---|
| 9,194,168 B1* | 11/2015 | Lu | ........................... | E05F 15/70 |
| 2005/0020210 A1* | 1/2005 | Krumm | .................. | G01C 21/00 |
| | | | | 455/41.2 |
| 2005/0020278 A1* | 1/2005 | Krumm | .................. | G01S 5/0252 |
| | | | | 455/456.1 |
| 2014/0300449 A1* | 10/2014 | Kounavis | ................. | G08B 7/06 |
| | | | | 340/6.1 |
| 2015/0073697 A1* | 3/2015 | Barrett | ................... | G01S 19/39 |
| | | | | 701/409 |
| 2016/0023636 A1* | 1/2016 | Keating | ................ | H04W 4/046 |
| | | | | 701/2 |
| 2016/0042303 A1* | 2/2016 | Medina | .................. | G06Q 10/02 |
| | | | | 705/5 |

(Continued)

*Primary Examiner* — Jess Whittington
(74) *Attorney, Agent, or Firm* — Dority & Manning, P.A.

(57) ABSTRACT

Systems, methods, tangible non-transitory computer-readable media, and devices for autonomous vehicle operation are provided. For example, a method can include receiving trip data that includes information associated with a request for the autonomous vehicle at a pick-up location. The autonomous vehicle can then travel to the pick-up location. The autonomous vehicle can detect one or more signals associated with the trip data. In response to determining that the one or more signals satisfy one or more broadcast criteria associated with authorizing access to the autonomous vehicle, the autonomous vehicle can activate one or more vehicle systems associated with fulfilling the request for the autonomous vehicle at the pick-up location. The one or more broadcast criteria can be based in part on one or more properties of the one or more signals.

19 Claims, 7 Drawing Sheets

(56) References Cited

U.S. PATENT DOCUMENTS

| | | | |
|---|---|---|---|
| 2016/0086391 A1* | 3/2016 | Ricci | G07C 5/008 |
| | | | 701/29.3 |
| 2016/0210675 A1* | 7/2016 | Smart | G06Q 10/02 |
| 2017/0115125 A1* | 4/2017 | Outwater | H04W 4/40 |
| 2017/0153714 A1* | 6/2017 | Gao | G06F 3/017 |
| 2017/0199281 A1* | 7/2017 | Laurichesse | G01S 19/39 |
| 2018/0098194 A1* | 4/2018 | Brown | H04W 4/023 |

* cited by examiner

SEAMLESS VEHICLE ENTRY

RELATED APPLICATION

The present application is based on and claims benefit of U.S. Provisional Patent Application No. 62/593,422 having a filing date of Dec. 1, 2017, which is incorporated by reference herein.

FIELD

The present disclosure relates generally to operation of an autonomous vehicle including detecting and accessing an autonomous vehicle using electronic signals.

BACKGROUND

Vehicles, including autonomous vehicles, can include a variety of access systems dedicated to regulating access to the vehicle. These access systems can assume various forms including traditional forms such as a mechanical lock and key. Further, many existing access systems lack flexibility such as the ability to accommodate a variety of passengers or to change access conditions remotely. Additionally, many existing access systems are complicated and can be burdensome to operate, often resulting in wasted time and effort on the part of prospective passengers. Accordingly, there exists a need for a more effective way to access an autonomous vehicle.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of autonomous vehicle operation. The computer-implemented method of operating an autonomous vehicle can include receiving, by an autonomous vehicle including one or more computing devices, trip data including information associated with a request for the autonomous vehicle at a pick-up location. The method can include travelling, by the autonomous vehicle, based in part on the trip data, to the pick-up location. Further, the method can include detecting, by the autonomous vehicle, one or more signals associated with the trip data. The method can include, responsive to determining that the one or more signals satisfy one or more broadcast criteria associated with authorizing access to the autonomous vehicle, activating, by the autonomous vehicle, one or more vehicle systems associated with fulfilling the request for the autonomous vehicle at the pick-up location.

Another example aspect of the present disclosure is directed to one or more tangible, non-transitory computer-readable media storing computer-readable instructions that when executed by one or more processors cause the one or more processors to perform operations. The operations can include receiving trip data including information associated with a request for an autonomous vehicle at a pick-up location. The operations can include controlling, based in part on the trip data, the autonomous vehicle to travel to the pick-up location. Further, the operations can include detecting one or more signals associated with the trip data. The operations can include, responsive to determining that the one or more signals satisfy one or more broadcast criteria associated with authorizing access to the autonomous vehicle, activating one or more vehicle systems associated with fulfilling the request for the autonomous vehicle at the pick-up location.

Another example aspect of the present disclosure is directed to an autonomous vehicle comprising one or more processors and one or more non-transitory computer-readable media storing instructions that when executed by the one or more processors cause the one or more processors to perform operations. The operations can include receiving trip data including information associated with a request for an autonomous vehicle at a pick-up location. The operations can include controlling, based in part on the trip data, the autonomous vehicle to travel to the pick-up location. Further, the operations can include detecting one or more signals associated with the trip data. The operations can include, responsive to determining that the one or more signals satisfy one or more broadcast criteria associated with authorizing access to the autonomous vehicle, activating one or more vehicle systems associated with fulfilling the request for the autonomous vehicle at the pick-up location.

Other example aspects of the present disclosure are directed to other systems, methods, vehicles, apparatuses, tangible non-transitory computer-readable media, and devices for autonomous vehicle operation.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
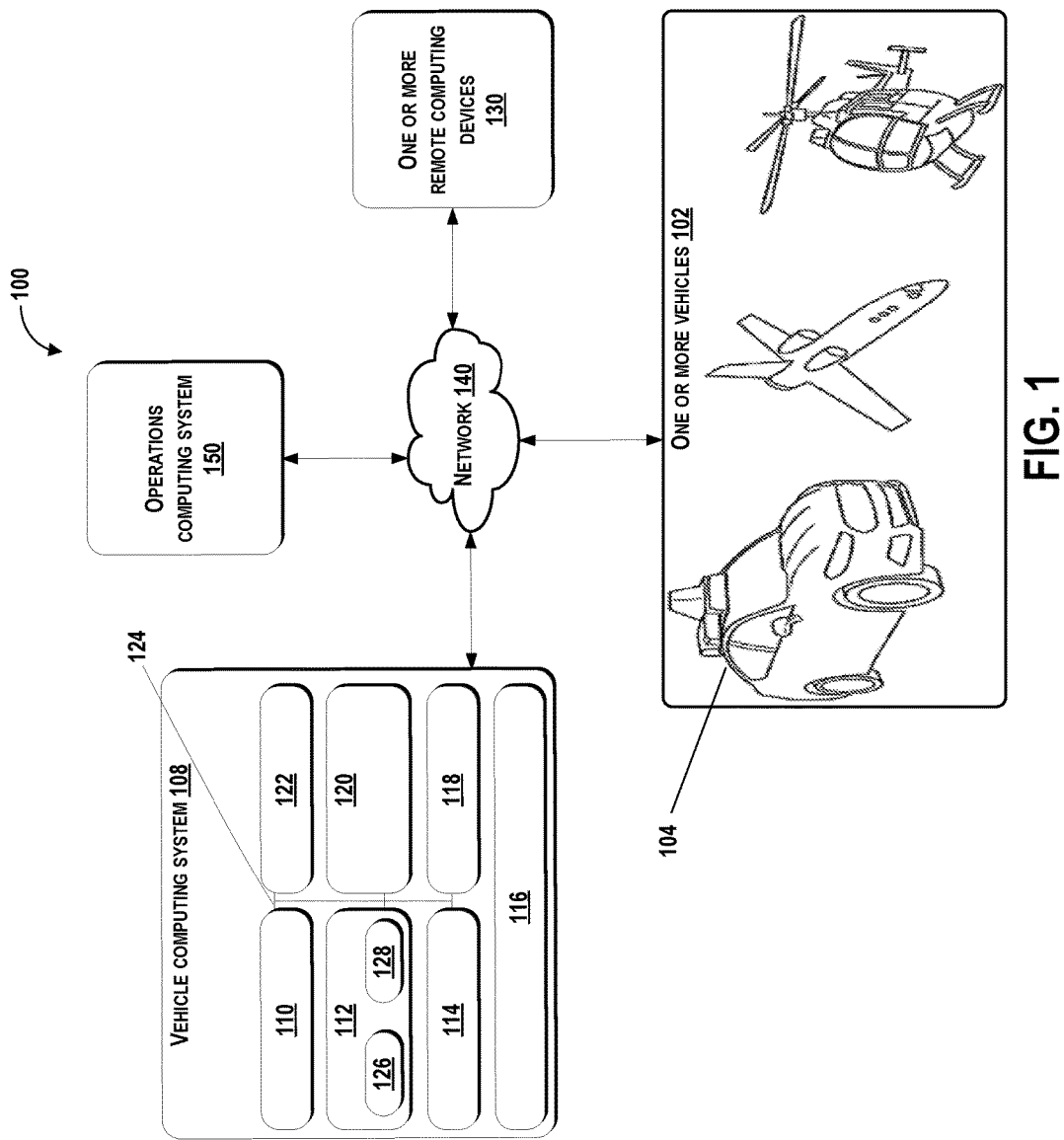
FIG. 1 depicts a diagram of an example system according to example embodiments of the present disclosure.

Example aspects of the present disclosure are directed to providing prospective passengers of a vehicle (e.g., an autonomous vehicle, a semi-autonomous vehicle, or a manually operated vehicle) with seamless vehicle entry that is based in part on the detection of signals (e.g., Bluetooth signals) transmitted by a remote computing device (e.g., a smartphone or wearable computing device). In particular, aspects of the present disclosure include a computing system (e.g., a computing system including one or more computing devices that can operate, communicate with, or control a vehicle) that can receive trip data associated with a request to pick-up a prospective passenger at a pick-up location. The computing system of the autonomous vehicle can receive trip data, which can include a unique identifier for the trip, and which can be associated with the autonomous vehicle and a remote computing device (e.g., a smartphone used by a prospective passenger).

After receiving the trip data, the vehicle can detect one or more signals (e.g., radio signals that include trip data). Upon the one or more signals satisfying one or more criteria (e.g., the received signal strength of the one or more signals exceeding a threshold value), the vehicle can activate one or more vehicle systems (e.g., unlocking doors of the vehicle). As such, the disclosed technology can more effectively provide seamless vehicle detection and access to a prospective passenger that has requested a vehicle.

For example, a prospective passenger can request to be picked up (by an autonomous vehicle) at their current location by sending a request from their mobile device. The request can include the location of the device based on the prospective passenger's input or through location information based on signals received by the mobile device from an external source including a global positioning satellite (GPS). The request can be received by a computing system of the autonomous vehicle that is associated with a computing system that determines an available vehicle that is closest to the current location of the prospective passenger. The computing system can detect possible identification information in the trip data and modify the trip data so that it excludes the identification information.

As the autonomous vehicle travels to the current location of the prospective passenger, the mobile device of the prospective passenger can transmit signals that are detectable by the autonomous vehicle. Upon detection of the signals from the mobile device, the autonomous vehicle can come to a stop within a predetermined distance of the pick-up location or the source of the signals (e.g., the mobile device) and unlock a door to admit the prospective passenger. Similarly, upon detection of signals which can be broadcast by the autonomous vehicle, the mobile device can further signal the vehicle to come to a stop within a predetermined distance of the pick-up location or the source of the signals (e.g., the mobile device) and unlock a door to admit the prospective passenger.

The disclosed technology can include an autonomous vehicle and/or a computing system associated with the autonomous vehicle. The autonomous vehicle and/or the computing system associated with the autonomous vehicle can include one or more computing devices that can process, generate, or exchange (e.g., send or receive) signals or data, including signals or data exchanged with various devices including one or more vehicle systems of the autonomous vehicle; and/or a remote computing device (e.g., a computing device including one or more processors and a memory) that can be used by a prospective passenger to request a vehicle (e.g., sending trip data from a mobile computing device including a smart phone or a wearable computing device) at a pick-up location.

For example, the computing system can exchange signals (e.g., electronic signals) or data with one or more vehicle systems including sensor systems (e.g., sensors that generate output based on the state of the physical environment external to the vehicle, including LIDAR, cameras, microphones, radar, or sonar); communication systems (e.g., wired or wireless communication systems that can exchange signals or data with other devices); navigation systems (e.g., devices that can receive signals from GPS, GLONASS, or other systems used to determine a vehicle's geographical location); notification systems (e.g., devices used to provide notifications to waiting prospective passengers, including display devices, status indicator lights, or audio output systems); braking systems (e.g., brakes of the vehicle including mechanical and/or electric brakes); propulsion systems (e.g., motors or engines including internal combustion engines or electric engines); and/or steering systems used to change the path, course, or direction of travel of the vehicle.

The computing system can receive trip data that is associated with a request for an autonomous vehicle at a pick-up location. The trip data can be received from one or more remote computing systems via one or more communication components associated with the computing system including wired and/or wireless communications systems. The trip data can include a pick-up location (e.g., an identifier of geographic location including a latitude/longitude and/or address) at which a prospective passenger will meet the autonomous vehicle; a current location of the prospective passenger; a pick-up time (e.g., a time at which the prospective passenger will meet the vehicle), a number of prospective passengers, and/or a prospective passenger cargo status (e.g., an indication of whether the prospective passenger is carrying cargo that will be placed in a cargo area of the vehicle).

In some embodiments, the computing system can determine any portions of the trip data that include possible personal identification data associated with a personal identity. For example, the computing system can determine whether personal identification data including a personal name (e.g., a name of the prospective passenger), an e-mail address, a phone number, or payment information (e.g., credit card number) of a prospective passenger is included in the trip request. Further, the computing system can exclude or actively make unavailable (e.g., delete, encrypt, or obfuscate) portions of the trip data that include the personal identification data from trip data that will be sent to the autonomous vehicle and the remote computing device. For example, in generating the trip data, the computing system can withhold the portions of the trip data associated with personal identification data. In this way, the privacy and security of prospective passengers is maintained when the trip data is sent.

The computing system can determine, based in part on the trip data, a location associated with the autonomous vehicle or the remote computing device. For example, the computing system can determine a latitude/longitude, address, and/or relative position (e.g., a position of the autonomous vehicle with respect to the remote computing device). Further, the computing system can determine, based in part on map data and the location of the autonomous vehicle and/or the remote computing device, a signal disruption value associated with the one or more signals being blocked or interfered with (e.g., a numerical value associated with an estimated reduction in the percentage of the one or more signals being received).

The map data can include one or more indications (e.g., indications of locations and magnitude of signal blockage or interference) of one or more structures or features that can block or interfere with the detection of the one or more signals including buildings (e.g., houses, apartment buildings, office buildings), tunnels (e.g., underground or underwater tunnels), or sources of electromagnetic transmissions (e.g., power lines and/or cell phone towers). In some implementations, broadcasting of the one or more signals can be based in part on the signal disruption value. For example, the autonomous vehicle or the remote computing device can selectively broadcast and/or detect the one or more signals based on the signal disruption value (e.g., stop broadcasting signals or broadcast infrequently when the autonomous vehicle is in a tunnel).

The computing system can direct the autonomous vehicle to travel to the pick-up location. For example, the computing system can determine a path from the current location of the autonomous vehicle to the pick-up location specified in the trip data. Based on the available path from the current location to the pick-up location, the computing system can activate one or more vehicle systems of the autonomous vehicle (e.g., the sensors, engine and/or steering systems) to direct the autonomous vehicle to the pick-up location.

In some embodiments, the computing system can broadcast one or more signals that include information associated with the location of the autonomous vehicle (e.g., a latitude and longitude of the autonomous vehicle). For example, the autonomous vehicle can broadcast one or more signals associated with the location of the autonomous vehicle to the remote computing systems via one or more communication components associated with the autonomous vehicle including wired and/or wireless communications systems. Further, the one or more signals can include cellular signals, radio signals, microwave signals, and the one or more signals can use various communications protocols including Bluetooth and/or Wi-Fi. In some embodiments, the one or more signals can include one or more broadcast instructions for a system or device that receives the trip data. For example, the one or more signals broadcast by the autonomous vehicle can include instructions of when or where to broadcast the one or more signals; and/or the signal protocol to use when broadcasting the one or more signals. In some embodiments, the one or more broadcast criteria can be based in part on the location of the autonomous vehicle. For example, the broadcast criteria can be based in part on the location of the autonomous vehicle being within a certain area or within a certain proximity to the pick-up area.

The computing system can detect the one or more signals associated with the trip data (e.g., one or more signals that contain portions of the trip data or data associated with the trip data). For example, the autonomous vehicle can include one or more components that can detect the one or more signals (e.g., a radio receiver and/or a Bluetooth receiver). In some implementations, the computing system can identify the source, the direction, the magnitude, or the frequency of the one or more signals. Further, the computing system can analyze the trip data when the trip data is included in the one or more signals.

In response to determining that the one or more signals satisfy one or more broadcast criteria, the computing system can activate one or more vehicle systems associated with fulfilling the request for the autonomous vehicle at the pick-up location. For example, satisfying the one or more broadcast criteria can include the autonomous vehicle determining that the strength of the one or more signals from the remote computing device exceeds a threshold strength that indicates that the remote computing device is within a predetermined proximity (e.g., within ten meters).

Activating the one or more vehicle systems can include unlocking an entrance to the autonomous vehicle (e.g., unlocking one or more doors to a passenger compartment of the vehicle), locking an entrance to the autonomous vehicle, opening an entrance to the autonomous vehicle (e.g., opening one or more doors to a passenger compartment of the vehicle), unlocking a cargo area of the autonomous vehicle (e.g., unlocking one or more doors to a trunk or other cargo/storage area of the autonomous vehicle), opening a cargo area of the autonomous vehicle (e.g., opening one or more doors to a trunk or other cargo/storage area of the vehicle), slowing the autonomous vehicle to a stop (e.g., reducing the velocity of the vehicle until the vehicle stops), or generating an availability indicator of the autonomous vehicle (e.g., the autonomous vehicle can include a display area that indicates a trip identifier associated with the trip that is also sent to the prospective passenger).

In some embodiments the computing system can determine, based in part on one or more properties of the one or more signals, proximity of the autonomous vehicle with respect to the remote computing device (e.g., a distance between the autonomous vehicle and the remote computing device). In some embodiments, satisfying the one or more broadcast criteria can include a determination that the proximity of the autonomous vehicle to the remote computing device is within a threshold distance. For example, satisfying the one or more broadcast criteria can include determining that the autonomous vehicle and the remote computing device are within thirty meters of one another, which can be determined based on one or more properties of the one or more signals. By way of example, the one or more properties of the one or more signals can include received signal strength (RSS) of the one or more signals or a signal to noise ratio (SNR) of the one or more signals.

The computing system can generate, based in part on the proximity of the autonomous vehicle with respect to the remote computing device, one or more indications from the autonomous vehicle or the remote computing device. The one or more indications can include one or more haptic indications (e.g., vibrations of the remote computing device), one or more light indications (e.g., one or more constant, flashing, and/or pulsating lights), one or more color indications (e.g., one or more different colors or combinations of colors that can be displayed on a display portion of the autonomous vehicle or the remote computing device), one or more audio indications (e.g., one or more chimes, music, and/or verbal messages), one or more pictorial indications (e.g., one or more pictures and/or photographs), and/or one or more written indications (e.g., one or more letters, words, or phrases).

In some embodiments a type (e.g., a light indication or a color indication), a magnitude (e.g., a size or brightness of a light indication), or a frequency (e.g., a frequency of haptic indications generated on the remote computing device), of the one or more indications can be based in part on the proximity of the autonomous vehicle with respect to the remote computing device. For example, as the remote computing device comes closer to the autonomous vehicle, the strength and frequency of haptic indications (e.g., vibrations) from the remote computing device can increase in inverse proportion with the distance to the autonomous vehicle.

The computing system can generate a trip identifier. The trip identifier can include information associated with one or more symbols (e.g., letters, words, marks, pictograms, pictures, colors, and patterns) that can be used to identify the trip. Further, the computing system can broadcast (e.g., send via a wireless network) one or more signals that include the trip identifier (e.g., the one or more signals that include the trip identifier can be detected by a remote computing device associated with a prospective passenger). For example, the trip identifier can include a red circle with a black letter "L" and a black number "6" inside the circle. The remote computing device associated with a prospective passenger waiting to be picked-up can receive the trip identifier and the autonomous vehicle can display the trip identifier on a display portion of the autonomous vehicle and the remote computing device can display the trip identifier on a display portion of the remote computing device. In this way, a prospective passenger can more effectively identify the autonomous vehicle that was requested for a trip. For example, in a situation in which multiple autonomous vehicles in close proximity to one another are waiting to pick-up multiple prospective passengers, the trip identifier can be used by a prospective passenger to identify their designated autonomous vehicle.

In some embodiments the trip identifier can include information associated with one or more symbols and can be based in part on a randomly generated trip identifier, or selected from a plurality of trip identifiers that have not been used for a predetermined period of time. For example, the computing system can randomly generate a trip identifier by randomly combining various elements of a symbol (e.g., color, shape, size, and/or pattern). Further, the computing system can access a plurality of trip identifiers (e.g., trip identifiers stored in a database of trip identifiers) that are associated with a last time of usage (e.g., the last time the trip identifier was used for a trip) and select a trip identifier that has not been used for a predetermined period of time (e.g., not used for a predetermined number of hours, the day of the trip, or the week of the trip).

The systems, methods, and devices included in the disclosed technology can provide a variety of technical effects and benefits to the overall operation of the vehicle and in particular to the process of coordinating the pick-up and delivery of one or more prospective passengers by one or more vehicles. One overall benefit of the disclosed technology is a reduction in the number of interactions performed by a prospective passenger prior to boarding an autonomous vehicle. As each interaction between an autonomous vehicle and a prospective passenger results in the consumption of energy (e.g., fuel by the autonomous vehicle and/or battery charge by a remote computing device used by a prospective passenger) and time (e.g., prospective passenger waiting time and/or the time a prospective passenger expends to board an autonomous vehicle), reducing the frequency or duration of interactions between the autonomous vehicle and the prospective passenger can result in less usage of energy and time by the autonomous vehicle and the prospective passenger.

The disclosed technology also offers the benefit of enhanced privacy for prospective passengers by receiving prospective passenger requests and then generating trip data that does not include the prospective passenger's personal information (e.g., prospective passenger name, address, and/or payment information). As such, even if intercepted by an unauthorized third-party, the trip data, which can be encrypted for further security, will not divulge a prospective passenger's personal information.

Further, by selectively detecting or broadcasting one or more signals, based in part on the location of structures or objects that can interfere with or block the one or more signals, the disclosed technology is able to more effectively conserve scarce energy resources (e.g., battery resources of a remote computing device including a smart phone). For example, the disclosed technology can access a map of a location that includes indications of the structures and objects that block the one or more signals. Based on the locations of blocking or interfering objects indicated in the map, the disclosed technology can initiate, halt, or adjust the sensitivity sensors that detect the one or more signals.

Accordingly, the disclosed technology provides a more effective assignment and coordination of prospective passengers to vehicles through more streamlined vehicle-passenger interactions, improved prospective passenger privacy, battery savings through use of mapping data that indicates the locations of objects and structures that block or interfere with signals, and overall time and resource savings through more efficient vehicle-passenger detection and prospective passenger boarding.

With reference now to FIGS. 1-9, example embodiments of the present disclosure will be discussed in further detail. FIG. 1 depicts a diagram of an example system 100 according to example embodiments of the present disclosure. The system 100 can include a plurality of vehicles 102; a vehicle 104; a vehicle computing system 108 that includes one or more computing devices 110; one or more data acquisition systems 112; an autonomy system 114; one or more control systems 116; one or more human machine interface systems 118; other vehicle systems 120; a communication system 122; a network 124; one or more image capture devices 126; one or more sensors 128; one or more remote computing devices 130; a communication network 140; and an operations computing system 150.

The operations computing system 150 can be associated with a service provider that provides one or more vehicle services to a plurality of users via a fleet of vehicles that includes, for example, the vehicle 104. The vehicle services can include transportation services (e.g., rideshare services), courier services, delivery services, and/or other types of services.

The operations computing system 150 can include multiple components for performing various operations and functions. For example, the operations computing system 150 can include and/or otherwise be associated with one or more remote computing devices that are remote from the vehicle 104. The one or more remote computing devices can include one or more processors and one or more memory devices. The one or more memory devices can store instructions that when executed by the one or more processors cause the one or more processors to perform operations and functions associated with operation of the vehicle including receiving data (e.g., trip data), controlling operation of an autonomous vehicle (e.g., the vehicle 104), and activating one or more vehicle systems (e.g., doors and/or storage areas of the vehicle 104).

For example, the operations computing system 150 can be configured to monitor and communicate with the vehicle 104 and/or its users to coordinate a vehicle service provided by the vehicle 104. To do so, the operations computing system 150 can manage a database that includes data including vehicle status data associated with the status of vehicles including the vehicle 104. The vehicle status data can include a location of the plurality of vehicles 102 (e.g., a latitude and longitude of a vehicle), the availability of a vehicle (e.g., whether a vehicle is available to pick-up or drop-off passengers or cargo), or the state of objects external to the vehicle (e.g., the proximity and/or location of objects external to the vehicle).

An indication, record, and/or other data indicative of the state of the one or more objects, including the proximity or location of the one or more objects, can be stored locally in one or more memory devices of the vehicle 104. Furthermore, the vehicle 104 can provide data indicative of the state of the one or more objects (e.g., proximity or location of the one or more objects) within a predefined distance of the vehicle 104 to the operations computing system 150, which can store an indication, record, and/or other data indicative of the state of the one or more objects within a predefined distance of the vehicle 104 in one or more memory devices associated with the operations computing system 150 (e.g., remote from the vehicle).

The operations computing system 150 can communicate with the vehicle 104 via one or more communications networks including the communications network 140. The communications network 140 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 140 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 104.

The vehicle 104 can be a ground-based vehicle (e.g., an automobile), an aircraft, and/or another type of vehicle. The vehicle 104 can be an autonomous vehicle that can perform various actions including driving, navigating, and/or operating, with minimal and/or no interaction from a human driver. The autonomous vehicle 104 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 104 can provide driving and navigational operation with minimal and/or no interaction from a human driver present in the vehicle. A semi-autonomous operational mode can be one in which the vehicle 104 can operate with some interaction from a human driver present in the vehicle. Park and/or sleep modes can be used between operational modes while the vehicle 104 performs various actions including waiting to provide a subsequent vehicle service, and/or recharging between operational modes.

The vehicle 104 can include a vehicle computing system 108. The vehicle computing system 108 can include various components for performing various operations and functions. For example, the vehicle computing system 108 can include one or more computing devices 110 on-board the vehicle 104. The one or more computing devices 110 can include one or more processors and one or more memory devices, each of which are on-board the vehicle 104. The one or more memory devices can store instructions that when executed by the one or more processors cause the one or more processors to perform operations and functions, such as those taking the vehicle 104 out-of-service, stopping the motion of the vehicle 104, determining the state of one or more objects within a predefined distance of the vehicle 104, or generating indications associated with the state of one or more objects within a predefined distance of the vehicle 104, as described herein.

The one or more computing devices 110 can implement, include, and/or otherwise be associated with various other systems on-board the vehicle 104. The one or more computing devices 110 can be configured to communicate with these other on-board systems of the vehicle 104. For instance, the one or more computing devices 110 can be configured to communicate with one or more data acquisition systems 112, an autonomy system 114 (e.g., including a navigation system), one or more control systems 116, one or more human machine interface systems 118, other vehicle systems 120, and/or a communication system 122. The one or more computing devices 110 can be configured to communicate with these systems via a network 124. The network 124 can include one or more data buses (e.g., controller area network (CAN)), on-board diagnostics connector (e.g., OBD-II), and/or a combination of wired and/or wireless communication links. The one or more computing devices 110 and/or the other on-board systems can send and/or receive data, messages, and/or signals, amongst one another via the network 124.

The one or more data acquisition systems 112 can include various devices configured to acquire data associated with the vehicle 104. This can include data associated with the vehicle including one or more of the vehicle's systems (e.g., health data), the vehicle's interior, the vehicle's exterior, the vehicle's surroundings, and/or the vehicle users. The one or more data acquisition systems 112 can include, for example, one or more image capture devices 126. The one or more image capture devices 126 can include one or more cameras, LIDAR systems), two-dimensional image capture devices, three-dimensional image capture devices, static image capture devices, dynamic (e.g., rotating) image capture devices, video capture devices (e.g., video recorders), lane detectors, scanners, optical readers, electric eyes, and/or other suitable types of image capture devices. The one or more image capture devices 126 can be located in the interior and/or on the exterior of the vehicle 104. The one or more image capture devices 126 can be configured to acquire image data to be used for operation of the vehicle 104 in an autonomous mode. For example, the one or more image capture devices 126 can acquire image data to allow the vehicle 104 to implement one or more machine vision techniques (e.g., to detect objects in the surrounding environment).

Additionally, or alternatively, the one or more data acquisition systems 112 can include one or more sensors 128. The one or more sensors 128 can include impact sensors, motion sensors, pressure sensors, mass sensors, weight sensors, volume sensors (e.g., sensors that can determine the volume of an object in liters), temperature sensors, humidity sensors, RADAR, sonar, radios, medium-range and long-range sensors (e.g., for obtaining information associated with the vehicle's surroundings), global positioning system (GPS) equipment, proximity sensors, and/or any other types of sensors for obtaining data indicative of parameters associated with the vehicle 104 and/or relevant to the operation of the vehicle 104.

The one or more data acquisition systems 112 can include the one or more sensors 128 dedicated to obtaining data associated with a particular aspect of the vehicle 104, including, the vehicle's fuel tank, engine, oil compartment, and/or wipers. The one or more sensors 128 can also, or alternatively, include sensors associated with one or more mechanical and/or electrical components of the vehicle 104. For example, the one or more sensors 128 can be configured to detect whether a vehicle door, trunk, and/or gas cap, is in an open or closed position. In some implementations, the data acquired by the one or more sensors 128 can help detect other vehicles and/or objects, road conditions (e.g., curves, potholes, dips, bumps, and/or changes in grade), measure a distance between the vehicle 104 and other vehicles and/or objects.

The vehicle computing system 108 can also be configured to obtain map data. For instance, a computing device of the vehicle (e.g., within the autonomy system 114) can be configured to receive map data from one or more remote computing device including the operations computing system 150 or the one or more remote computing devices 130 (e.g., associated with a geographic mapping service provider). The map data can include any combination of two-dimensional or three-dimensional geographic map data associated with the area in which the vehicle was, is, or will be travelling.

The data acquired from the one or more data acquisition systems 112, the map data, and/or other data can be stored in one or more memory devices on-board the vehicle 104. The on-board memory devices can have limited storage capacity. As such, the data stored in the one or more memory devices may need to be periodically removed, deleted, and/or downloaded to another memory device (e.g., a database of the service provider). The one or more computing devices 110 can be configured to monitor the memory devices, and/or otherwise communicate with an associated processor, to determine how much available data storage is in the one or more memory devices. Further, one or more of the other on-board systems (e.g., the autonomy system 114) can be configured to access the data stored in the one or more memory devices.

The autonomy system 114 can be configured to allow the vehicle 104 to operate in an autonomous mode. For instance, the autonomy system 114 can obtain the data associated with the vehicle 104 (e.g., acquired by the one or more data acquisition systems 112). The autonomy system 114 can also obtain the map data. The autonomy system 114 can control various functions of the vehicle 104 based, at least in part, on the acquired data associated with the vehicle 104 and/or the map data to implement the autonomous mode. For example, the autonomy system 114 can include various models to perceive road features, signage, and/or objects, people, animals, etc. based on the data acquired by the one or more data acquisition systems 112, map data, and/or other data.

In some implementations, the autonomy system 114 can include one or more machine-learned models that use the data acquired by the one or more data acquisition systems 112, the map data, and/or other data to assist in the operation of the autonomous vehicle. Moreover, the acquired data can help detect other vehicles and/or objects, road conditions (e.g., curves, potholes, dips, bumps, changes in grade, or the like), measure a distance between the vehicle 104 and other vehicles or objects, etc. The autonomy system 114 can be configured to predict the position and/or movement (or lack thereof) of such elements (e.g., using one or more odometry techniques). The autonomy system 114 can be configured to plan the motion of the vehicle 104 based, at least in part, on such predictions. The autonomy system 114 can implement the planned motion to appropriately navigate the vehicle 104 with minimal or no human intervention. For instance, the autonomy system 114 can include a navigation system configured to direct the vehicle 104 to a destination location. The autonomy system 114 can regulate vehicle speed, acceleration, deceleration, steering, and/or operation of other components to operate in an autonomous mode to travel to such a destination location.

The autonomy system 114 can determine a position and/or route for the vehicle 104 in real-time and/or near real-time. For instance, using acquired data, the autonomy system 114 can calculate one or more different potential routes (e.g., calculate a route every fraction of a second). The autonomy system 114 can then select which route to take and cause the vehicle 104 to navigate accordingly. By way of example, the autonomy system 114 can calculate one or more different straight paths (e.g., including some in different parts of a current lane), one or more lane-change paths, one or more turning paths, and/or one or more stopping paths. The vehicle 104 can select a path based, at last in part, on acquired data, current traffic factors, travelling conditions associated with the vehicle 104, etc. In some implementations, different weights can be applied to different criteria when selecting a path. Once selected, the autonomy system 114 can cause the vehicle 104 to travel according to the selected path.

The one or more control systems 116 of the vehicle 104 can be configured to control one or more aspects of the vehicle 104. For example, the one or more control systems 116 can control one or more access points of the vehicle 104. The one or more access points can include features such as the vehicle's door locks, trunk lock, hood lock, fuel tank access, latches, and/or other mechanical access features that can be adjusted between one or more states, positions, locations, etc. For example, the one or more control systems 116 can be configured to control an access point (e.g., door lock) to adjust the access point between a first state (e.g., lock position) and a second state (e.g., unlocked position). Additionally, or alternatively, the one or more control systems 116 can be configured to control one or more other electrical features of the vehicle 104 that can be adjusted between one or more states. For example, the one or more control systems 116 can be configured to control one or more electrical features (e.g., hazard lights, microphone) to adjust the feature between a first state (e.g., off) and a second state (e.g., on).

The one or more human machine interface systems 118 can be configured to allow interaction between a user (e.g., human), the vehicle 104 (e.g., the vehicle computing system 108), and/or a third party (e.g., an operator associated with the service provider). The one or more human machine interface systems 118 can include a variety of interfaces for the user to input and/or receive information from the vehicle computing system 108. For example, the one or more human machine interface systems 118 can include a graphical user interface, direct manipulation interface, web-based user interface, touch user interface, attentive user interface, conversational and/or voice interfaces (e.g., via text messages, chatter robot), conversational interface agent, interactive voice response (IVR) system, gesture interface, and/or other types of interfaces. The one or more human machine interface systems 118 can include one or more input devices (e.g., touchscreens, keypad, touchpad, knobs, buttons, sliders, switches, mouse, gyroscope, microphone, other hardware interfaces) configured to receive user input. The one or more human machine interfaces 118 can also include one or more output devices (e.g., display devices, speakers, and/or lights) to receive and output data associated with the interfaces.

The other vehicle systems 120 can be configured to control and/or monitor other aspects of the vehicle 104. For instance, the other vehicle systems 120 can include software update monitors, an engine control unit, transmission control unit, the on-board memory devices, etc. The one or more computing devices 110 can be configured to communicate with the other vehicle systems 120 to receive data and/or to send to one or more signals. By way of example, the software update monitors can provide, to the one or more computing devices 110, data indicative of a current status of the software running on one or more of the on-board systems and/or whether the respective system requires a software update.

The communication system 122 can be configured to allow the vehicle computing system 108 (and its one or more computing devices 110) to communicate with other computing devices. In some implementations, the vehicle computing system 108 can use the communication system 122 to communicate with one or more user devices over the networks. In some implementations, the communication system 122 can allow the one or more computing devices 110 to communicate with one or more of the systems on-board the vehicle 104. The vehicle computing system 108 can use the communication system 122 to communicate with the operations computing system 150 and/or the one or more remote computing devices 130 over the networks (e.g., via one or more wireless signal connections). The communication system 122 can include any suitable components for interfacing with one or more networks, including for example, transmitters, receivers, ports, controllers, antennas, or other suitable components that can help facilitate communication with one or more remote computing devices that are remote from the vehicle 104.

In some implementations, the one or more computing devices 110 on-board the vehicle 104 can obtain vehicle data indicative of one or more parameters associated with the vehicle 104. The one or more parameters can include information, such as health and maintenance information, associated with the vehicle 104, the vehicle computing system 108, one or more of the on-board systems, etc. For example, the one or more parameters can include fuel level, engine conditions, tire pressure, conditions associated with the vehicle's interior, conditions associated with the vehicle's exterior, mileage, time until next maintenance, time since last maintenance, available data storage in the on-board memory devices, a charge level of an energy storage device in the vehicle 104, current software status, needed software updates, and/or other heath and maintenance data of the vehicle 104.

At least a portion of the vehicle data indicative of the parameters can be provided via one or more of the systems on-board the vehicle 104. The one or more computing devices 110 can be configured to request the vehicle data from the on-board systems on a scheduled and/or as-needed basis. In some implementations, one or more of the on-board systems can be configured to provide vehicle data indicative of one or more parameters to the one or more computing devices 110 (e.g., periodically, continuously, as-needed, as requested). By way of example, the one or more data acquisitions systems 112 can provide a parameter indicative of the vehicle's fuel level and/or the charge level in a vehicle energy storage device. In some implementations, one or more of the parameters can be indicative of user input. For example, the one or more human machine interfaces 118 can receive user input (e.g., via a user interface displayed on a display device in the vehicle's interior). The one or more human machine interfaces 118 can provide data indicative of the user input to the one or more computing devices 110.

In some implementations, the one or more computing devices 130 can receive input and can provide data indicative of the user input to the one or more computing devices 110. The one or more computing devices 110 can obtain the data indicative of the user input from the one or more computing devices 130 (e.g., via a wireless communication).

The one or more computing devices 110 can be configured to determine the state of the vehicle 104 and the environment around the vehicle 104 including the state of one or more objects external to the vehicle including pedestrians, cyclists, motor vehicles (e.g., trucks, and/or automobiles), roads, waterways, and/or buildings. Further, the one or more computing devices 110 can be configured to determine one or more properties of one or more signals (e.g., radio signals) detected by the one or more sensors 128. The one or more computing devices 110 can determine various information including when the one or more signals are associated with a request for an autonomous vehicle (e.g., the autonomous vehicle 104) at a pick-up location.

Figure 2:
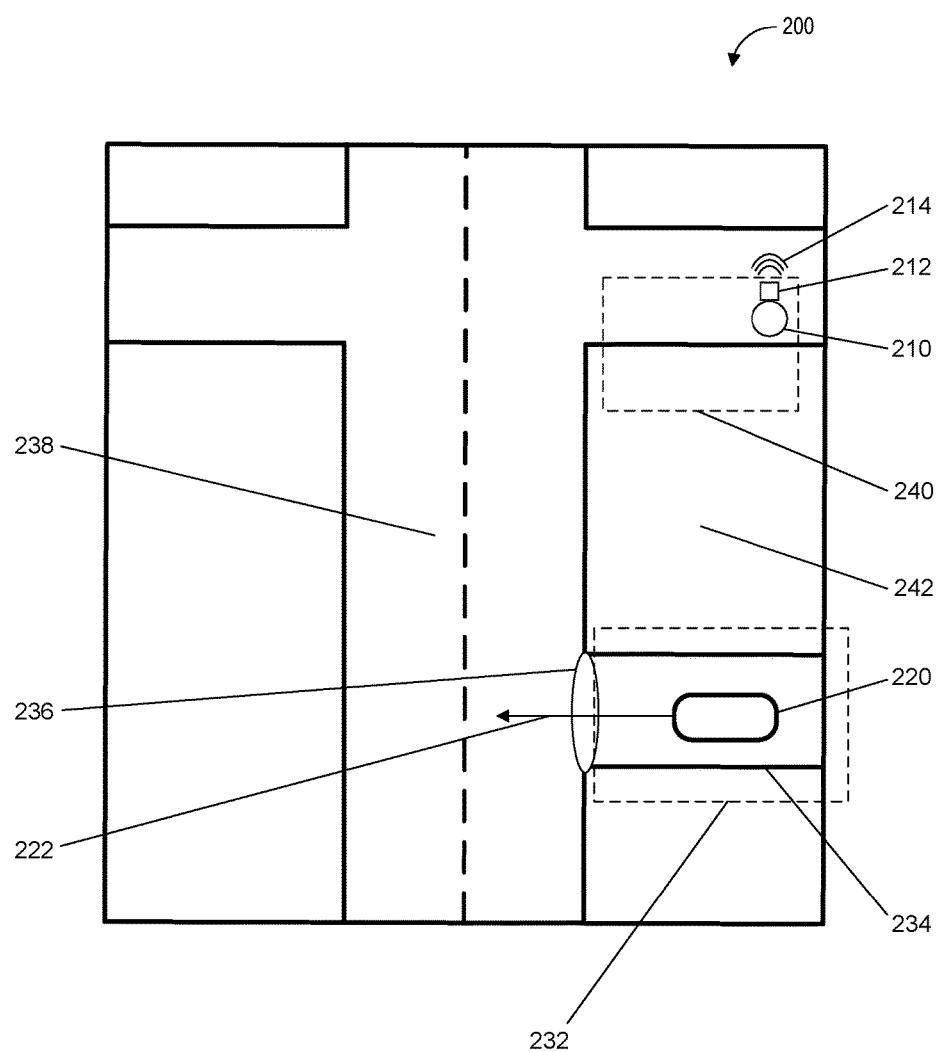
FIG. 2 depicts an example of an environment including an autonomous vehicle according to example embodiments of the present disclosure.

FIG. 2 depicts an example of an environment including an autonomous vehicle according to example embodiments of the present disclosure. One or more actions or events depicted in FIG. 2 can be implemented by one or more devices (e.g., one or more computing devices) or systems including, for example, the vehicle 104, the vehicle computing system 108, or the operations computing system 150, shown in FIG. 1. As illustrated, FIG. 2 shows an environment 200 that includes a prospective passenger 210, a remote computing device 212, signals 214, a vehicle 220, a path 222, a signal disruption area 232, a tunnel 234, a tunnel exit 236, a street 238, a pick-up area 240, and a building 242.

In the environment 200, the vehicle 220 (e.g., an autonomous vehicle) is located within five meters below the surface of the street 238 and inside the tunnel 234, which is a subterranean tunnel with a tunnel exit 236 that faces the street 238. In this example, the vehicle 220 has received trip data associated with a request to pick up the prospective passenger 210 at the pick-up area 240. Further, the prospective passenger 210 is using the remote computing device 212 (e.g., a smart phone) that is configured to transmit and/or receive one or more signals (e.g., radio signals) including the signals 214 that are being transmitted by the remote computing device 212. Due to the vehicle 220 being located inside the tunnel 234, which is inside the signal disruption area 232, the vehicle 220 is not able to detect the signals 214 through the building 242.

In some embodiments, the vehicle 220 can access map data that includes an indication of the layout and geography of the environment 200 including an indication of the areas (e.g., the signal disruption area 232) in which detection of one or more signals (e.g., the signals 214) can be disrupted and/or blocked. In this example, the vehicle 220 is travelling along the path 222 that will take the vehicle 220 past the tunnel exit 236 and out of the signal disruption area 232. Accordingly, when the vehicle 220 is on the street 238, the vehicle 220 may be able to detect the signals 214 and travel more precisely to the user 210, who is waiting in the pick-up area 240.

Figure 3:
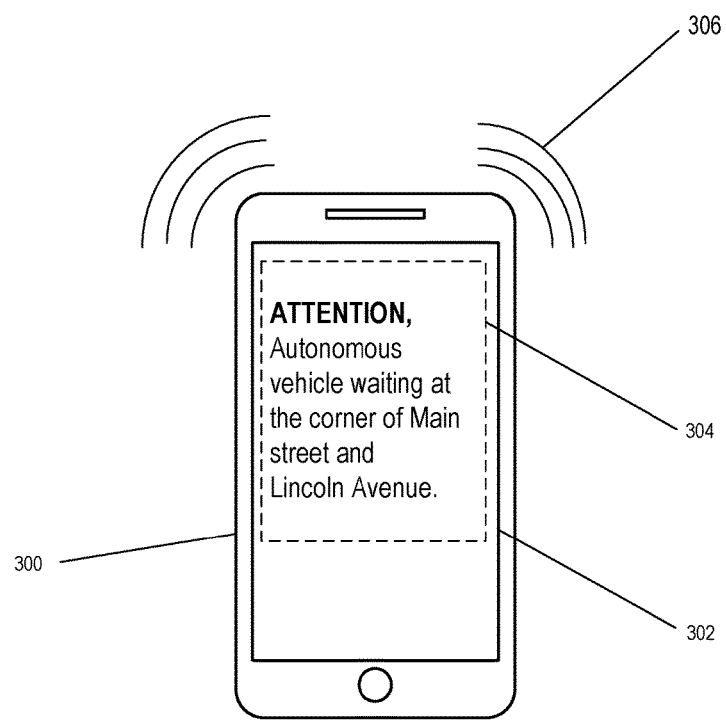
FIG. 3 depicts an example of a remote computing device receiving indications from an autonomous vehicle according to example embodiments of the present disclosure.

FIG. 3 depicts an example of a remote computing device receiving indications from an autonomous vehicle according to example embodiments of the present disclosure. One or more actions or events depicted in FIG. 3 can be implemented by one or more devices (e.g., one or more computing devices) or systems including, for example, the vehicle 104, the vehicle computing system 108, or the operations computing system 150, shown in FIG. 1. FIG. 3 includes an illustration of a remote computing device 300 that can be used exchange (e.g., send and/or receive) one or more signals or data with one or more computing systems including, for example, the vehicle 104, the vehicle computing system 108, or the operations computing system 150, shown in FIG. 1. As shown, FIG. 3 illustrates the remote computing device 300, a display area 302, a visual indication 304, and a haptic indication 306.

In this example, the remote computing device 300 (e.g., a smart phone) of a user who has requested an autonomous vehicle, has received one or more signals from the autonomous vehicle. The one or more signals from an autonomous vehicle (e.g., the vehicle 104 or the vehicle 220) include trip data associated with the location of the autonomous vehicle which can be used to generate the visual indication 304 ("ATTENTION, Autonomous vehicle waiting at the corner of Main street and Lincoln Avenue.") on the display area 302 of the remote computing device 300.

Further, the one or more signals from the autonomous vehicle (e.g., the vehicle 104 or the vehicle 220) can include trip data that can be used to generate the haptic indication 306 (e.g., one or more vibrations) that can be produced by haptic components (not shown) of the remote computing device 300. The haptic indication 306 can provide an indication to the user associated with the remote computing device 300 that the vehicle requested by the user is nearby. Further, the haptic indication 306 can be detected by a user associated with the remote computing device 300, without the user having to look at, or otherwise interact with, the remote computing device 300. In this way, the user can seamlessly receive an indication that a requested vehicle is nearby.

Figure 4:
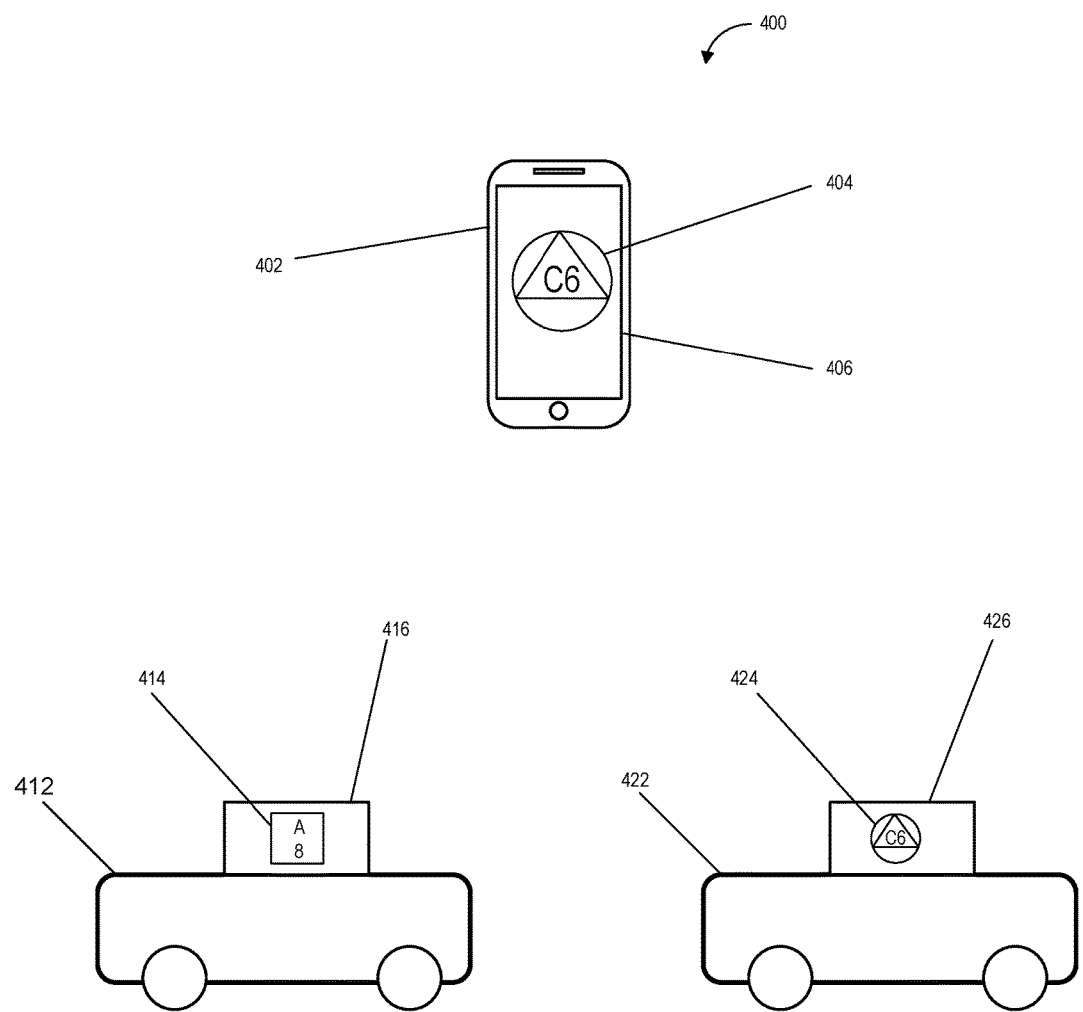
FIG. 4 depicts an environment including a remote computing device and autonomous vehicles according to example embodiments of the present disclosure.

FIG. 4 depicts an environment including a remote computing device and autonomous vehicles according to example embodiments of the present disclosure. One or more actions or events depicted in FIG. 4 can be implemented by one or more devices (e.g., one or more computing devices) or systems including, for example, the vehicle 104, the vehicle computing system 108, or the operations computing system 150, shown in FIG. 1. As illustrated, FIG. 4 shows an environment 400 that includes a remote computing device 402, a trip identifier 404, a display area 406, a vehicle 412, a trip identifier 414, a display area 416, a vehicle 422, a trip identifier 424, and a display area 426.

In the environment 400, the vehicle 422 (e.g., an autonomous vehicle) has received trip data that includes data associated with a trip identifier 424 which can be represented on a display device (e.g., a liquid crystal display monitor) as a circle with a triangle inside the circle and the letter "C" followed by the number "6" inside the triangle. The trip identifier can be used by a prospective passenger to identify the vehicle that the prospective passenger is waiting for.

In this example, the remote computing device 402 (e.g., a smart phone) used by a prospective passenger waiting for the vehicle 422 has received one or more signals that include the trip data associated with the trip identifier 424 and the trip identifier 404, which is displayed on the display area 406 of the remote computing device 402, and which matches the trip identifier 424 that is displayed on the display area 426 of the vehicle 422. Accordingly, as the prospective passenger associated with the remote computing device 402 waits for the vehicle 422 on a busy city street, a number of vehicles including the vehicle 412 and the vehicle 422 can wait within sight of the prospective passenger associated with the remote computing device 402. The prospective passenger associated with the remote computing device 402 can compare the trip identifier 404 displayed on the display area 406 to the trip identifier 414 displayed on the display area 416 and to the trip identifier 424 displayed on the display area 426. Based on the similarity in the appearance of the trip identifier 404 and the trip identifier 424, the prospective passenger associated with the remote computing device 402 can determine that the vehicle 422 is the vehicle that was requested.

Figure 5:
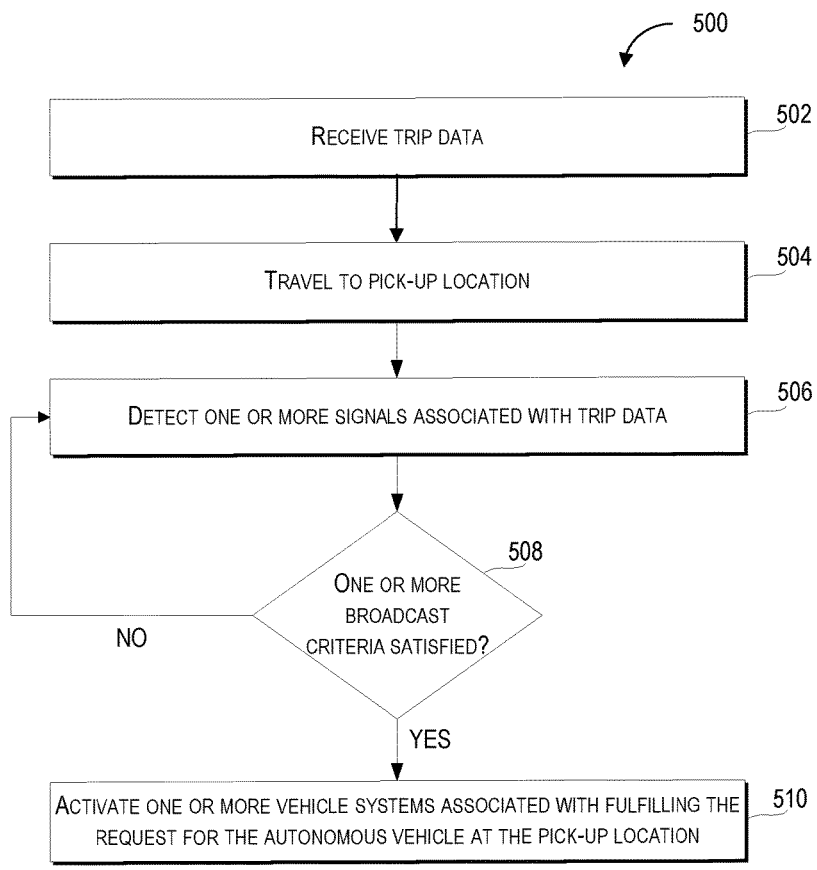
FIG. 5 depicts a flow diagram of an example method of autonomous vehicle operation according to example embodiments of the present disclosure.

FIG. 5 depicts a flow diagram of an example method 500 of autonomous vehicle operation according to example embodiments of the present disclosure. One or more portions of the method 500 can be implemented by one or more devices (e.g., one or more computing devices) or systems including, for example, the vehicle 104, the vehicle computing system 108, or the operations computing system 150, shown in FIG. 1. Moreover, one or more portions of the method 500 can be implemented as an algorithm on the hardware components of the devices described herein (e.g., as in FIG. 1) to, for example, receive trip data, travel to a pick-up location, and activate one or more vehicle systems. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 502, the method 500 can include receiving trip data including information associated with a request for the autonomous vehicle at a pick-up location. For example, the vehicle 104 and/or the vehicle computing system 108 can receive one or more signals and/or data using the communication system 122. Further, the trip data can be received by the vehicle 104 and/or the vehicle computing system 108 via a network including the network 124. For example, the trip data can be received via one or more communication networks including wired and/or wireless communications systems.

The trip data can be received from one or more sources including remote computing systems associated with exchanging (e.g., sending and/or receiving) data associated with the management and/or scheduling of trips for an autonomous vehicle. The trip data can include a pick-up location (e.g., an identifier of geographic location including a latitude/longitude, a set of directions to the pick-up location, and/or an address of the pick-up location) at which a prospective passenger will meet the autonomous vehicle; a current location of the prospective passenger; a pick-up time (e.g., a time at which the prospective passenger will meet the vehicle); a number of prospective passengers; and/or a prospective passenger cargo status (e.g., an indication of whether the prospective passenger is carrying cargo, whether the cargo will be placed in a cargo area of the vehicle, and/or dimensions or mass associated with the cargo).

At 504, the method 500 can include travelling, based in part on the trip data, to the pick-up location. In some embodiments, a computing system (e.g., the vehicle computing system 108) associated with the autonomous vehicle can control the autonomous vehicle to travel to the pick-up location. For example, the vehicle computing system 108 can direct the vehicle 104 to travel to the pick-up location. By way of further example, a path from the current location of the autonomous vehicle to the pick-up location specified in the trip data can be determined based on an autonomy system of the autonomous vehicle that determines an available path between the current location and the pick-up location. Based on the determination of the available path from the current location to the pick-up location, a computing system associated with the autonomous vehicle (e.g., the vehicle computing system 108) can activate one or more vehicle systems of the autonomous vehicle (e.g., the sensors, navigation, engine, braking, and/or steering systems) to direct the autonomous vehicle to the pick-up location.

At 506, the method 500 can include detecting one or more signals associated with the trip data.). For example, the vehicle (e.g., the vehicle 104) can include one or more components (e.g., the communication system 122) that can detect the one or more signals (e.g., one or more radio signals). In some implementations, the computing system can identify the source, the direction, the magnitude (e.g., signal strength), and/or the frequency of the one or more signals. Further, the trip data included in the one or more signals can be analyzed to determine for example, whether the trip data includes one or more errors. For example, one or more error detection techniques (e.g., parity bit check) and/or error correction techniques (e.g., Hamming code) can be applied to trip data in the one or more signals to determine whether an error has occurred in the signal data (e.g., the signal data is corrupted and/or incomplete) and to correct errors in the signal data when an error has been detected in the signal data.

At 508, the method 500 can include determining whether, when, or that, the one or more signals satisfy one or more broadcast criteria associated with authorizing access to the autonomous vehicle. The one or more broadcast criteria can include the signal strength of the one or more signals exceeding or being less than a signal strength threshold, the frequency of the one or more signals being within a predetermined frequency range, and/or the one or more signals are determined to be emitted from one or more locations or directions.

For example, the vehicle computing system 108 can determine whether, when, or that, the one or more broadcast criteria have been satisfied based on a comparison of properties of the one or more signals to one or more thresholds associated with the respective one or more properties. Further, the vehicle computing system 108 can compare the signal strength of a signal measured in micro-volts per meter to a signal strength threshold set at a predetermined amount of microvolts per meter, such that the one or more broadcast criteria are satisfied when the determined micro-volts per meter of the one or more signals exceeds the signal strength threshold.

In response to the one or more broadcast criteria being satisfied, the method 500 can proceed to 510. In response to the one or more broadcast criteria not being satisfied, the method 500 can end or return to 502, 504, or 506.

At 510, the method 500 can include activating one or more vehicle systems. Activating the one or more vehicle systems can include activating one or more vehicle systems associated with fulfilling the request for the autonomous vehicle at the pick-up location. For example, the vehicle computing system 108 can generate one or more control signals to activate and/or control one or more vehicle systems (e.g., engine/motor systems, braking systems, steering systems, and/or door control systems) of the vehicle 104.

In some embodiments, activating the one or more vehicle systems can include unlocking an entrance to the autonomous vehicle (e.g., unlocking, for an authorized prospective passenger, one or more doors to a passenger compartment of the vehicle); locking an entrance to the autonomous vehicle (e.g., locking one or more doors to a passenger compartment of the vehicle); opening an entrance to the autonomous vehicle (e.g., opening one or more doors, for an authorized prospective passenger, to a passenger compartment of the vehicle); unlocking a cargo area of the autonomous vehicle (e.g., unlocking, for an authorized prospective passenger, one or more doors to a trunk or other cargo/storage area of the autonomous vehicle); opening a cargo area of the autonomous vehicle (e.g., opening, for an authorized prospective passenger, one or more doors to a trunk or other cargo/storage area of the vehicle); slowing the autonomous vehicle to a stop (e.g., applying brakes of the vehicle until the vehicle stops); and/or generating an availability indicator of the autonomous vehicle (e.g., the autonomous vehicle can include a display area that indicates the availability of the vehicle).

Figure 6:
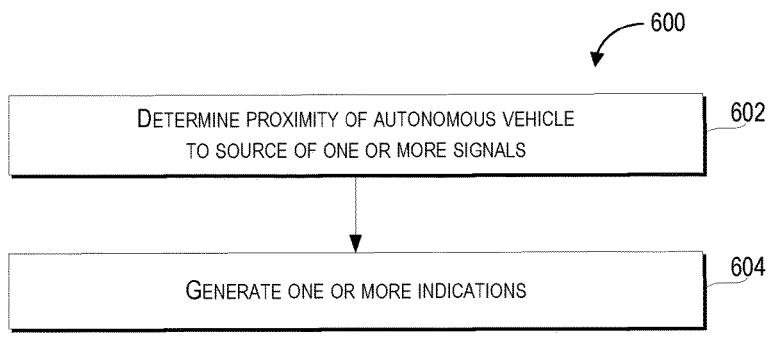
FIG. 6 depicts a flow diagram of an example method of autonomous vehicle operation according to example embodiments of the present disclosure.

FIG. 6 depicts a flow diagram of an example method 600 of autonomous vehicle operation according to example embodiments of the present disclosure. One or more portions of the method 600 can be implemented by one or more devices (e.g., one or more computing devices) or systems including, for example, the vehicle 104, the vehicle computing system 108, and/or the operations computing system 150, shown in FIG. 1. Moreover, one or more portions of the method 600 can be implemented as an algorithm on the hardware components of the devices described herein (e.g., as in FIG. 1) to, for example, receive trip data, travel to a pick-up location, and activate one or more vehicle systems. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 602, the method 600 can include determining, based in part on the one or more properties of the one or more signals, proximity of the autonomous vehicle to a source of the one or more signals. For example, the vehicle computing system 108 can determine the proximity of the autonomous vehicle 104 to one of the one or more remote computing devices 130 (e.g., a smart phone used by a prospective passenger of the vehicle 104) based in part on the received signal strength of the one or more signals detected by the one or more sensors 128 of the vehicle 104. The one or more properties of the one or more signals can include received signal strength of the one or more signals and/or signal to noise ratio of the one or more signals.

In some embodiments, satisfying the one or more broadcast criteria can include the proximity of the autonomous vehicle to the source of the one or more signals being within a threshold distance. For example, satisfying the one or more broadcast criteria can include determining that the an autonomous vehicle and a remote computing device are within ten meters of one another, which can be determined based on one or more properties of the one or more signals.

At 604, the method 600 can include generating, based in part on the proximity of the autonomous vehicle to the source of the one or more signals, one or more indications. For example, the vehicle computing system 108 can generate one or more control signals to activate and/or control one or more output devices (e.g., display devices, audio devices, lights, and/or haptic devices) of the vehicle 104, which can be used to output the one or more indications (e.g., an indication that the vehicle 104 is available). The type of the one or more indications can include one or more haptic indications (e.g., one or more vibrations of a door handle of an autonomous vehicle); one or more light indications (e.g., one or more blinking interior lights or headlights of the autonomous vehicle); one or more color indications (e.g., activating one or more colored lights on the interior and/or exterior of the autonomous vehicle); one or more audio indications (e.g., one or more recorded announcements from the autonomous vehicle audio system); one or more pictorial indications (e.g., one or more pictures, photographs, and/or video displayed on a display output device of the autonomous vehicle), one or more pictographic indications (e.g., one or more icons displayed on a display output device of the autonomous vehicle); and/or one or more textual indications (e.g., one or more portions of text displayed on a display output device of the autonomous vehicle).

In some embodiments, the type, magnitude, and/or frequency of the one or more indications can be based in part on the proximity of the autonomous vehicle to the source of the one or more signals. For example, as the distance between the vehicle and a remote computing device of a prospective passenger decreases, the strength and frequency of one or more light indications (e.g., blinking headlights) from the vehicle can increase in inverse proportion to the distance between the autonomous vehicle and the remote computing device.

Figure 7:
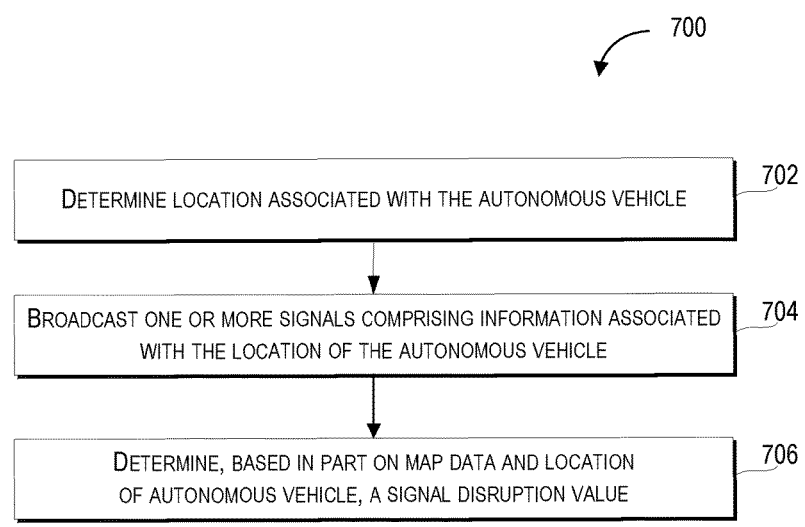
FIG. 7 depicts a flow diagram of an example method of autonomous vehicle operation according to example embodiments of the present disclosure.

FIG. 7 depicts a flow diagram of an example method 700 of autonomous vehicle operation according to example embodiments of the present disclosure. One or more portions of the method 700 can be implemented by one or more devices (e.g., one or more computing devices) or systems including, for example, the vehicle 104, the vehicle computing system 108, or the operations computing system 150, shown in FIG. 1. Moreover, one or more portions of the method 700 can be implemented as an algorithm on the hardware components of the devices described herein (e.g., as in FIG. 1) to, for example, receive trip data, travel to a pick-up location, and activate one or more vehicle systems. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 702, the method 700 can include determining a location associated with the autonomous vehicle. Determining the location of the autonomous vehicle can be based in part on various inputs including one or more signals received from an external source and/or a determination of the location and/or position of the autonomous vehicle based in part on the use of one or more sensors to determine the location of the autonomous vehicle relative to one or more objects in the environment (e.g., image sensors can be used to determine the proximity of the autonomous vehicle to a landmark location). For example, the vehicle computing system 108 can receive one or more signals from a source of radio-navigation information (e.g., GPS and/or GLONASS), and based on the one or more signals, can determine the location of the vehicle 104.

In some embodiments, the one or more broadcast criteria can be based in part on the location associated with the autonomous vehicle. For example, the one or more broadcast criteria can include the autonomous vehicle being within a particular location (e.g., a pick-up area), the autonomous vehicle not being within a particular location (e.g., on a busy high-way), or the autonomous vehicle being within a predetermined distance (e.g., within twenty meters of a pick-up location) of a particular location.

At 704, the method 700 can include broadcasting one or more signals including information associated with the location of the autonomous vehicle. For example, the vehicle 104 can broadcast one or more signals including information associated with the location of the vehicle 104 (e.g., a latitude and longitude of the vehicle 104) using the communication system 122. The autonomous vehicle can broadcast one or more signals associated with the location of the autonomous vehicle (e.g., the latitude and longitude of the autonomous vehicle and/or a location of the autonomous vehicle relative to an pre-established point of reference location) to the remote computing systems via one or more communication systems associated with the autonomous vehicle including wired and/or wireless communications systems.

Further, the one or more signals can include radio signals, cellular signals, microwave signals, and the one or more signals can use various communications protocols including Bluetooth and/or Wi-Fi. In some embodiments, the one or more signals can include one or more broadcast instructions for a system or device that receives the trip data. For example, the one or more signals broadcast by the autonomous vehicle can include instructions of when to broadcast the one or more signals (e.g., a time to broadcast the one or more signals or a duration after receiving the one or more signals); where to broadcast the one or more signals (e.g., a latitude and longitude from which to broadcast the one or more signals); and/or the signal protocol (e.g., a wireless signal protocol) to use when broadcasting the one or more signals.

In some embodiments, the one or more broadcast criteria can be based in part on the location of the autonomous vehicle. For example, the broadcast criteria can be based in part on the location of the autonomous vehicle being within a certain area or within a certain proximity (e.g., a distance in meters) of the pick-up area.

At 706, the method 700 can include determining, based in part on map data and the location of the autonomous vehicle, a signal disruption value associated with the one or more signals being blocked or interfered with (e.g., a data structure including one or more numerical values associated with an estimated reduction in the amount of the one or more signals being received by a receiving device of the autonomous vehicle). For example, the vehicle computing system 108 can determine, based in part on the map data, the extent to which one or more structures (e.g., buildings) in an area can block one or more signals. Based on the extent to which the one or more structures in an area block the one or more signals, the vehicle can use different communication channels or frequencies (e.g., different wireless frequencies) to detect the one or more signals.

The map data can include an indication of one or more structures, conditions, and/or features that can block or interfere with the detection of the one or more signals. For example, the one or more structures, conditions, and/or features can include buildings (e.g., office buildings, and/or residential buildings); tunnels (e.g., tunnels through mountainsides and/or under waterways); vegetation (e.g., trees and/or bushes); weather conditions (e.g., lightning, snow, hail, rain, and/or fog); and/or sources of electromagnetic transmissions (e.g., narrowband and/or broadband interference from electric devices). The extent to which the one or more signals are blocked can be based in part on various factors including the type of materials in the structures (e.g., a concrete wall may disrupt a signal more than a wooden wall of the same thickness), the size of the materials in the structures (e.g., a ten centimeter thick wall may disrupt a signal more than a five centimeter thick wall of the same material), and/or the moisture associated with the structure (e.g., a wet structure may disrupt a signal more than a dry structure).

In some embodiments, the detection of the one or more signals can be based in part on the signal disruption value. For example, the sensitivity of the autonomous vehicle detecting the one or more signals and/or the protocols or frequencies associated with the one or more signals can be changed based in part on the signal disruption value.

Figure 8:
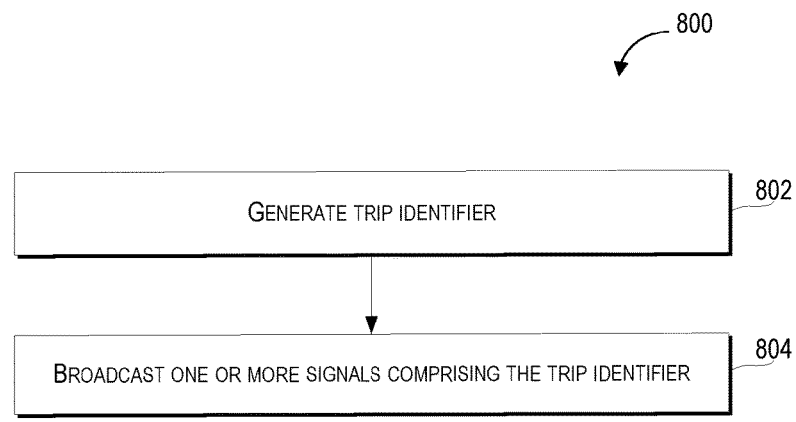
FIG. 8 depicts a flow diagram of an example method of autonomous vehicle operation according to example embodiments of the present disclosure.

FIG. 8 depicts a flow diagram of an example method 800 of autonomous vehicle operation according to example embodiments of the present disclosure. One or more portions of the method 800 can be implemented by one or more devices (e.g., one or more computing devices) or systems including, for example, the vehicle 104, the vehicle computing system 108, or the operations computing system 150, shown in FIG. 1. Moreover, one or more portions of the method 800 can be implemented as an algorithm on the hardware components of the devices described herein (e.g., as in FIG. 1) to, for example, receive trip data, travel to a pick-up location, and activate one or more vehicle systems. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 802, the method 800 can include generating a trip identifier to identify the autonomous vehicle. The trip identifier can include information associated with one or more symbols (e.g., letters, words, numbers, marks, signs, pictograms, pictures, icons, colors, and/or patterns) that can be used to identify the trip. For example, the vehicle computing system 108 can access one or more data structures that include data associated with one or more trip identifiers (e.g., numbers, letters, words, and/or images) and generate the trip identifier based on a selection of one or more trip identifiers and/or by using information associated with a random seed to generate a trip identifier using a pseudorandom number generator.

In some embodiments the trip identifier can include information associated with one or more symbols and can be based in part on a randomly generated trip identifier, or selected from a plurality of trip identifiers that have not been used for a predetermined period of time. For example, a trip identifier can be generated by randomly (e.g., through use of a pseudorandom number generator and a random seed) combining various elements of one or more symbols (e.g., one or more numbers, text, colors, shapes, sizes, and/or patterns). Further, a plurality of trip identifiers (e.g., trip identifiers stored in a database of trip identifiers) associated with a last time of usage (e.g., the last time the trip identifier was used for a pick-up location) can be accessed and a trip identifier that has not been used for a predetermined period of time (e.g., not used for a predetermined duration) can be selected for use as the trip identifier.

At 804, the method 800 can include broadcasting one or more signals including the trip identifier. For example, the trip identifier can include a white square with a black letter "S" and a green number "39" inside the square. A remote computing device associated with a prospective passenger waiting to be picked-up can receive one or more signals associated with the trip identifier and the remote computing device can display the trip identifier on a display portion of the remote computing device. Further, and the autonomous vehicle can display the trip identifier (e.g., the same trip identifier displayed on the remote computing device) on a display portion on the exterior of the autonomous vehicle (e.g., a display panel on the roof of the autonomous vehicle, on a window of the autonomous vehicle, on a door of the autonomous vehicle, and/or an a body panel of the autonomous vehicle). Accordingly, by using the trip identifier, a prospective passenger of the autonomous vehicle can more easily identify the autonomous vehicle that was requested for their trip.

Figure 9:
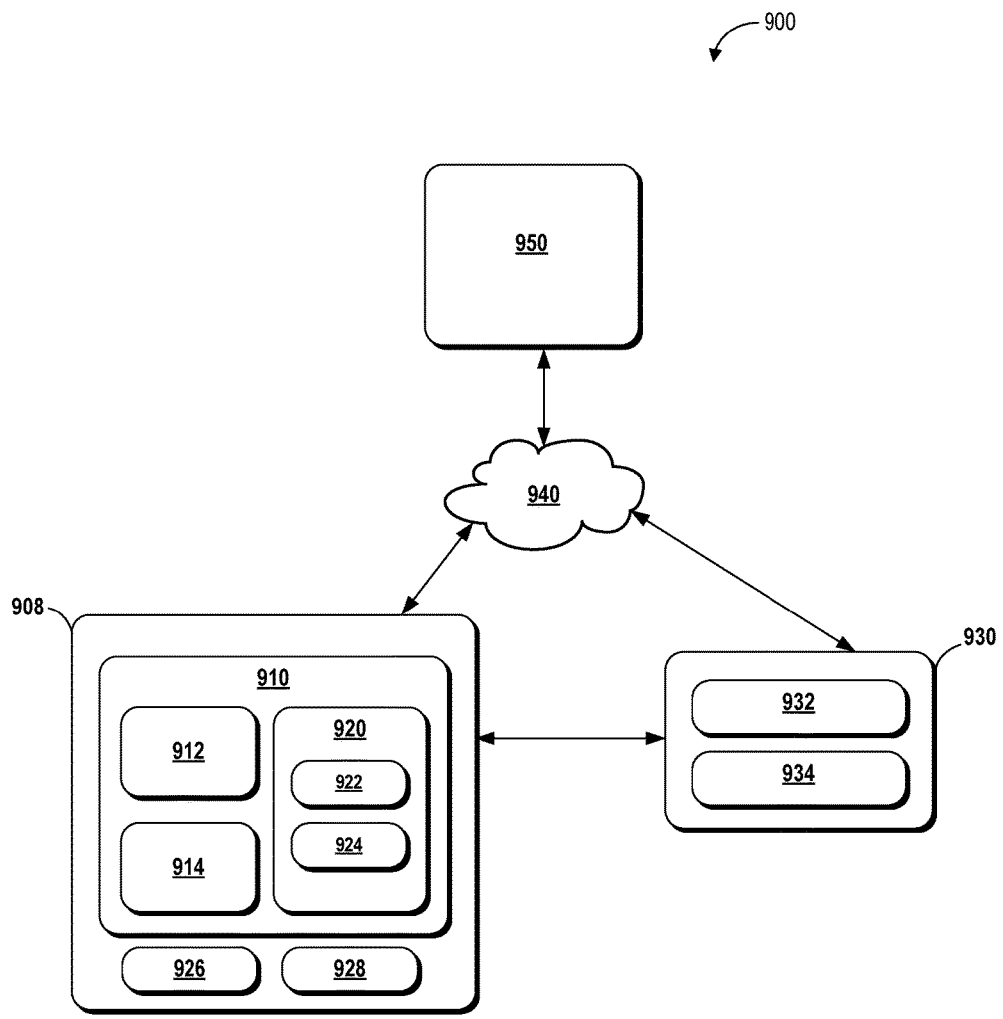
FIG. 9 depicts a diagram of an example system according to example embodiments of the present disclosure.

FIG. 9 depicts an example system 900 according to example embodiments of the present disclosure. The system 900 can include a vehicle computing system 908 which can include some or all of the features of the vehicle computing system 108 depicted in FIG. 1; one or more computing devices 910 which can include some or all of the features of the one or more computing devices 110; a communication interface 912; one or more processors 914; one or more memory devices 920; memory system 922; memory system 924; one or more input devices 926; one or more output devices 928; one or more computing devices 930 which can include some or all of the features of the one or more computing devices 130 depicted in FIG. 1; one or more input devices 932; one or more output devices 934; a network 940 which can include some or all of the features of the network 140 depicted in FIG. 1; and an operations computing system 950 which can include some or all of the features of the operations computing system 150 depicted in FIG. 1.

The vehicle computing system 908 can include the one or more computing devices 910. The one or more computing devices 910 can include one or more processors 914 which can be included on-board a vehicle including the vehicle 104 and one or more memory devices 920 which can be included on-board a vehicle including the vehicle 104. The one or more processors 914 can be any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 914 can include a single processor or a plurality of processors that are operatively and/or selectively connected. The one or more memory devices 920 can include one or more non-transitory computer-readable storage media, such as RAM, ROM, EEPROM, EPROM, flash memory devices, magnetic disks, and/or combinations thereof.

The one or more memory devices 920 can store data or information that can be accessed by the one or more processors 914. For instance, the one or more memory devices 920 which can be included on-board a vehicle including the vehicle 104, can include a memory system 922 that can store computer-readable instructions that can be executed by the one or more processors 914. The memory system 922 can include software written in any suitable programming language that can be implemented in hardware (e.g., computing hardware). Further, the memory system 922 can include instructions that can be executed in logically and/or virtually separate threads on the one or more processors 914. The memory system 922 can include any set of instructions that when executed by the one or more processors 914 cause the one or more processors 914 to perform operations.

For example, the one or more memory devices 920 which can be included on-board a vehicle including the vehicle 104 can store instructions, including specialized instructions, that when executed by the one or more processors 914 on-board the vehicle cause the one or more processors 914 to perform operations such as any of the operations and functions of the one or more computing devices 910 or for which the one or more computing devices 910 are configured, including the operations for receiving data (e.g., path data, context data, and/or traffic regulation data), receiving one or more navigational inputs, and/or activating one or more vehicle systems (e.g., one or more portions of method 900 or method 1000), or any other operations or functions for operation of a vehicle, as described in the present disclosure.

The one or more memory devices 920 can include a memory system 924 that can store data that can be retrieved, manipulated, created, and/or stored by the one or more computing devices 910. The data stored in memory system 924 can include, for instance, data associated with a vehicle including the vehicle 104; data acquired by the one or more data acquisition systems 112; path data associated with a path traversed by a vehicle; context data associated with the state of an environment; traffic regulation data associated with traffic regulations in an environment; data associated with user input; data associated with one or more actions and/or control command signals; data associated with users; and/or other data or information. The data in the memory system 924 can be stored in one or more databases. The one or more databases can be split up so that they are located in multiple locales on-board a vehicle which can include the vehicle 104. In some implementations, the one or more computing devices 910 can obtain data from one or more memory devices that are remote from a vehicle, which can include the vehicle 104.

The environment 900 can include the network 940 (e.g., a communications network) which can be used to exchange (send or receive) signals (e.g., electronic signals) or data (e.g., data from a computing device) including signals or data exchanged between computing devices including the operations computing system 950, the vehicle computing system 1108, or the one or more computing devices 930. The network 940 can include any combination of various wired (e.g., twisted pair cable) and/or wireless communication mechanisms (e.g., cellular, wireless, satellite, microwave, and radio frequency) and/or any desired network topology (or topologies). For example, the communications network 140 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 104.

The one or more computing devices 910 can also include communication interface 912 used to communicate with one or more other systems which can be included on-board a vehicle including the vehicle 104 (e.g., over the network 940. The communication interface 912 can include any suitable components for interfacing with one or more networks, including for example, transmitters, receivers, ports, controllers, antennas, other hardware and/or software.

The vehicle computing system 1108 can also include one or more input devices 926 and/or one or more output devices 928. The one or more input devices 926 and/or the one or more output devices 928 can be included and/or otherwise associated with a human-machine interface system. The one or more input devices 926 can include, for example, hardware for receiving information from a user, such as a touch screen, touch pad, mouse, data entry keys, speakers, and/or a microphone suitable for voice recognition. The one or more output devices 928 can include one or more display devices (e.g., display screen, CRT, LCD) and/or one or more audio output devices (e.g., loudspeakers). The display devices and/or the audio output devices can be used to facilitate communication with a user. For example, a human operator (e.g., associated with a service provider) can communicate with a current user of a vehicle including the vehicle 104 via at least one of the display devices and the audio output devices.

The one or more computing devices 930 can include various types of computing devices. For example, the one or more computing devices 930 can include a phone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The one or more computing devices 930 can be associated with a user. The one or more computing devices 930 described herein can also be representative of a user device that can be included in the human machine interface system of a vehicle including the vehicle 104.

The one or more computing devices 930 can include one or more input devices 932 and/or one or more output devices 934. The one or more input devices 932 can include, for example, hardware for receiving information from a user, such as a touch screen, touch pad, mouse, data entry keys, speakers, and/or a microphone suitable for voice recognition. The one or more output devices 934 can include hardware for providing content for display. For example, the one or more output devices 934 can include a display device (e.g., display screen, CRT, LCD), which can include hardware for a user interface.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing devices remote from the vehicle (e.g., the operations computing system and its associated computing devices) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of autonomous vehicle operation, the computer-implemented method comprising:
    receiving, by an autonomous vehicle comprising one or more computing devices, trip data comprising information associated with a request for the autonomous vehicle at a pick-up location;

travelling, by the autonomous vehicle, based in part on the trip data, to the pick-up location;

determining, by the autonomous vehicle, a location of the autonomous vehicle;

determining, by the autonomous vehicle, a signal disruption value based in part on the location of the autonomous vehicle and map data comprising an indication of one or more features that disrupt detection of one or more autonomous vehicle signals;

broadcasting, by the autonomous vehicle, one or more autonomous vehicle signals comprising information associated with the location of the autonomous vehicle, wherein the one or more autonomous vehicle signals are broadcast using a protocol based in part on the signal disruption value;

detecting, by the autonomous vehicle, one or more signals associated with the trip data;

determining, by the autonomous vehicle, based in part on one or more properties of the one or more signals, a proximity of the autonomous vehicle to a source of the one or more signals;

generating, by the autonomous vehicle, based in part on the proximity of the autonomous vehicle to the source of the one or more signals, one or more indications, wherein a frequency of the one or more indications is based in part on the proximity of the autonomous vehicle to the source of the one or more signals; and responsive to determining that the one or more signals satisfy one or more broadcast criteria associated with authorizing access to the autonomous vehicle, activating, by the autonomous vehicle, one or more vehicle systems associated with fulfilling the request for the autonomous vehicle at the pick-up location.

2. The computer-implemented method of claim 1, wherein the satisfying the one or more broadcast criteria comprises the proximity of the autonomous vehicle to the source of the one or more signals being within a threshold distance.

3. The computer-implemented method of claim 1, wherein the one or more properties of the one or more signals comprise a received signal strength of the one or more signals or a signal to noise ratio of the one or more signals.

4. The computer-implemented method of claim 1,
wherein a type, or a magnitude of the one or more indications is based in part on the proximity of the autonomous vehicle to the source of the one or more signals.

5. The computer-implemented method of claim 4, wherein the type of the one or more indications comprises one or more haptic indications, one or more light indications, one or more color indications, one or more audio indications, one or more pictorial indications, one or more pictographic indications, or one or more textual indications.

6. The computer-implemented method of claim 1, further comprising:

wherein the one or more broadcast criteria are based in part on the location associated with the autonomous vehicle.

7. The computer-implemented method of claim 1, wherein the one or more features comprise buildings, tunnels, vegetation, weather conditions, or sources of electromagnetic transmissions.

8. The computer-implemented method of claim 1, further comprising:

generating, by the autonomous vehicle, a trip identifier to identify the autonomous vehicle; and broadcasting, by the autonomous vehicle, one or more signals comprising the trip identifier.

9. The computer-implemented method of claim 8, wherein the trip identifier comprises information associated with one or more symbols and is based in part on a randomly generated trip identifier generated through use of a pseudo-random number generator and a random seed, or selected from a plurality of trip identifiers that have not been used for a predetermined period of time.

10. The computer-implemented method of claim 1, wherein the activating the one or more vehicle systems one or more vehicle systems associated with fulfilling the request for the autonomous vehicle at the pick-up location comprises unlocking an entrance to the autonomous vehicle, locking the entrance to the autonomous vehicle, opening the entrance to the autonomous vehicle, unlocking a cargo area of the autonomous vehicle, opening the cargo area of the autonomous vehicle, slowing the autonomous vehicle to a stop, or generating an availability indicator of the autonomous vehicle.

11. The computer-implemented method of claim 1, wherein the protocol comprises Bluetooth or Wi-Fi.

12. One or more tangible, non-transitory computer-readable media storing computer-readable instructions that when executed by one or more processors cause the one or more processors to perform operations, the operations comprising:

receiving trip data comprising information associated with a request for an autonomous vehicle at a pick-up location;

controlling, based in part on the trip data, the autonomous vehicle to travel to the pick-up location;

determining a location of the autonomous vehicle;

determining a signal disruption value based in part on the location of the autonomous vehicle and map data comprising an indication of one or more features that disrupt detection of one or more autonomous vehicle signals;

broadcasting one or more autonomous vehicle signals comprising information associated with the location of the autonomous vehicle, wherein the one or more autonomous vehicle signals are broadcast using a protocol based in part on the signal disruption value;

detecting one or more signals associated with the trip data;

determining, based in part on one or more properties of the one or more signals, a proximity of the autonomous vehicle to a source of the one or more signals;

generating, based in part on the proximity of the autonomous vehicle to the source of the one or more signals, one or more indications, wherein a frequency of the one or more indications is based in part on the proximity of the autonomous vehicle to the source of the one or more signals; and responsive to determining that the one or more signals satisfy one or more broadcast criteria associated with authorizing access to the autonomous vehicle, activating one or more vehicle systems associated with fulfilling the request for the autonomous vehicle at the pick-up location.

13. The one or more tangible, non-transitory computer-readable media of claim 12, wherein the satisfying the one or more broadcast criteria comprise the proximity of the autonomous vehicle to the source of the one or more signals being within a threshold distance.

14. The one or more tangible, non-transitory computer-readable media of claim 12, further comprising:

generating, based in part on the proximity of the autonomous vehicle to the source of the one or more signals, one or more indications, wherein a type, or a magnitude of the one or more indications is based in part on the proximity of the autonomous vehicle to the source of the one or more signals.

15. The one or more tangible, non-transitory computer-readable media of claim 12, wherein the protocol comprises Bluetooth or Wi-Fi.

16. A computing system comprising:
one or more processors;
a memory comprising one or more computer-readable media, the memory storing computer-readable instructions that when executed by the one or more processors cause the one or more processors to perform operations comprising:
  receiving trip data comprising information associated with a request for an autonomous vehicle at a pick-up location;
  controlling, based in part on the trip data, the autonomous vehicle to travel to the pick-up location;
  determining a location of the autonomous vehicle;
  determining a signal disruption value based in part on the location of the autonomous vehicle and map data comprising an indication of one or more features that disrupt detection of one or more autonomous vehicle signals;
  broadcasting one or more autonomous vehicle signals comprising information associated with the location of the autonomous vehicle, wherein the one or more autonomous vehicle signals are broadcast using a protocol based in part on the signal disruption value;
  detecting one or more signals associated with the trip data;
  determining, based in part on one or more properties of the one or more signals, a proximity of the autonomous vehicle to a source of the one or more signals;
  generating, based in part on the proximity of the autonomous vehicle to the source of the one or more signals, one or more indications, wherein a frequency of the one or more indications is based in part on the proximity of the autonomous vehicle to the source of the one or more signals; and
  responsive to determining that the one or more signals satisfy one or more broadcast criteria associated with authorizing access to the autonomous vehicle, activating one or more vehicle systems associated with fulfilling the request for the autonomous vehicle at the pick-up location.

17. The computing system of claim 16, wherein the satisfying the one or more broadcast criteria comprises the proximity of the autonomous vehicle to the source of the one or more signals being within a threshold distance.

18. The computing system of claim 16, further comprising:
generating, based in part on the proximity of the autonomous vehicle to the source of the one or more signals, one or more indications, wherein a type, or a magnitude of the one or more indications is based in part on the proximity of the autonomous vehicle to the source of the one or more signals.

19. The computing system of claim 16, wherein the protocol comprises Bluetooth or Wi-Fi.

* * * * *